(12) United States Patent
Pigott

(10) Patent No.: US 7,737,670 B2
(45) Date of Patent: Jun. 15, 2010

(54) POWER CONVERTER WITH IMPROVED EFFICIENCY

(75) Inventor: John M. Pigott, Phoenix, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 128 days.

(21) Appl. No.: 12/098,883

(22) Filed: Apr. 7, 2008

(65) Prior Publication Data

US 2009/0251117 A1 Oct. 8, 2009

(51) Int. Cl.
  *G05F 1/00* (2006.01)
(52) U.S. Cl. ...................... 323/272; 323/283
(58) Field of Classification Search .................. 323/272, 323/283, 224, 234
  See application file for complete search history.

(56) References Cited

U.S. PATENT DOCUMENTS

| | | | |
|---|---|---|---|
| 6,346,798 B1* | 2/2002 | Passoni et al. | 323/272 |
| 6,825,641 B2 | 11/2004 | Pigott | |
| 7,053,713 B1* | 5/2006 | Dening | 330/276 |
| 7,570,036 B2* | 8/2009 | Tang et al. | 323/283 |

* cited by examiner

*Primary Examiner*—Shawn Riley
(74) *Attorney, Agent, or Firm*—Ingrassia, Fisher & Lorenz, P.C.

(57) ABSTRACT

A power converter (10) includes a controller (12) configured to generate a switching signal. A first section (14) is coupled to the controller (12) and has first and second switches (26, 30). The first section (14) is configured such that the first and second switches (26,30) operate in an alternating manner in response to the switching signal. A second section (16) is coupled to the controller (12) and has third and fourth switches (50,54). The second section (16) is configured such that the third and fourth switches (50,54) operate in an alternating manner in response to the switching signal. The first and second sections (14,16) are coupled to a node (88). A detection circuit (18) is coupled to the second section (16). The detection circuit (18) is configured to measure a voltage at the node between the operation of the third and fourth switches (50,54) and deactivate the second section when the voltage is above a predetermined threshold.

20 Claims, 4 Drawing Sheets

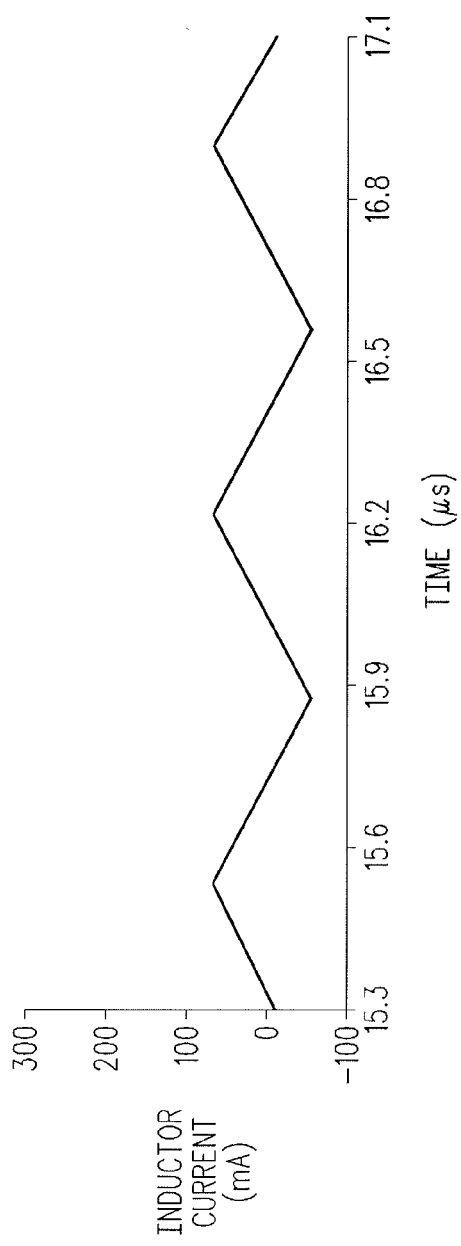
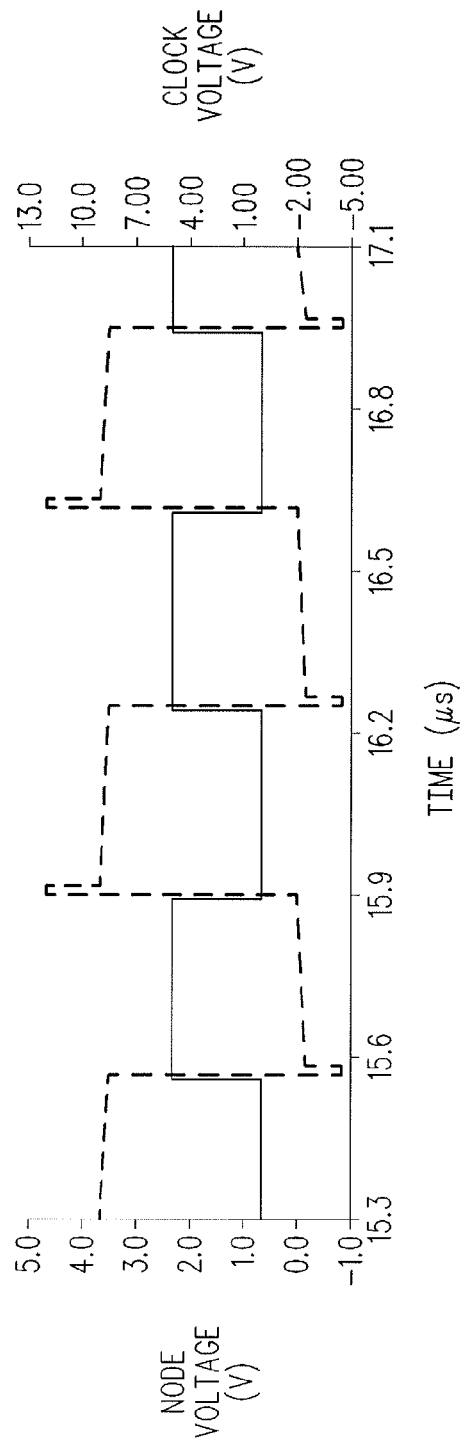
FIG. 4
FIG. 5

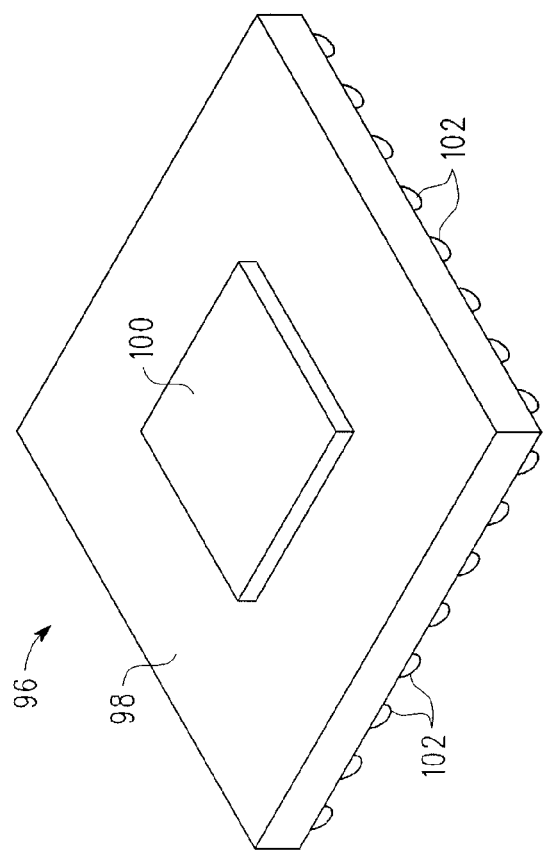
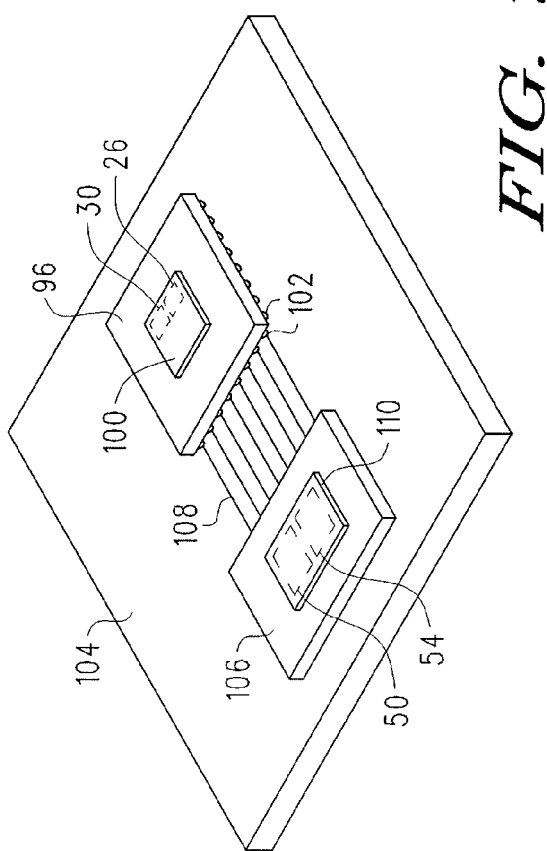

POWER CONVERTER WITH IMPROVED EFFICIENCY

FIELD OF THE INVENTION

The present invention generally relates to power converters, and more particularly relates to a system and method for improving the efficiency of a power converter.

BACKGROUND OF THE INVENTION

Modern electrical devices, such as computers, cellular phones, and personal digital assistants (PDAs), include electrical components that may be powered by regulated direct current (DC) supply voltages of specific values, when the only electrical power available may be from a different DC voltage source having a voltage level different from the DC supply voltage or voltages desired. Further, the available DC voltage source may be substantially unregulated. For example, in desk-top computers, unregulated DC voltages are typically derived from alternating current (AC) mains by rectification and crude filtering to produce a voltage source having an average DC value with a substantial ripple corresponding to the mains AC frequency. This unregulated voltage is typically different in magnitude from the voltage or voltages required to power the various components in the computer. In battery operated devices, such as lap-top computers, cellular phones, or PDAs, the voltage supplied by the battery may vary substantially over time, and it may be of a different value than the voltage or voltages required to power the individual components of the device.

Power converters, such as switched-mode DC-DC converters, are often used in such applications, as they provide improved efficiency over dissipative conversion methods. In such switched-mode DC-DC converters, an unregulated input voltage is converted into a periodic pulse waveform that has an average value which varies with the ratio of the pulse width to the pulse period. This conversion is typically performed by controlling the states of several switches, such as field effect transistors (FETs), connected between the input voltage and particular device. By controlling the states of the various transistors, a desired average current can be impressed through the inductor and thus efficiently control the power flow between the power source and the load.

Two important parameters in the performance of such converters are gate drive losses ($Q_G$) and resistive losses ($I^2R_{ON}$) of the switch FETs. Resistive losses are most significant when the converters are operating at high loads (i.e., currents). Conversely, at lower loads, gate drive losses are dominant because of the small amounts of current flowing through the converters decrease the resistive losses. In order to maximize converter performance, attempts are often made to minimize and balance these losses by optimizing the FET sizes.

Accordingly, it is desirable to provide a power converter with improved efficiency with respect to gate losses and resistive losses. Furthermore, other desirable features and characteristics of the present invention will become apparent from the subsequent detailed description and the appended claims, taken in conjunction with the accompanying drawings and the foregoing technical field and background.

BRIEF DESCRIPTION OF THE DRAWINGS

The present invention will hereinafter be described in conjunction with the following drawings, wherein like numerals denote like elements.

FIG. 4 is a graph of the inductor current of the power converter of FIG. 1 during a period of low load operation;

FIG. 5 is a graph of the node voltage and the clock voltage of the power converter of FIG. 1 during the same period of time as FIG. 4;

FIG. 6 is an isometric view of a semiconductor package into which the power converter of FIG. 1 may be integrated; and FIG. 7 is an isometric view of a circuit board having the semiconductor package of FIG. 6 and a discrete switch package mounted thereto.

DETAILED DESCRIPTION OF THE INVENTION

The following detailed description is merely exemplary in nature and is not intended to limit the invention or application and uses of the invention. Furthermore, there is no intention to be bound by any expressed or implied theory presented in the preceding technical field, background, brief summary, or the following detailed description. It should also be noted that FIGS. 1-7 are merely illustrative and may not be drawn to scale.

FIG. 1 to FIG. 7 illustrate power converters and methods for converting power. The power converter includes a controller, a first section with first and second switches, a second section with third and fourth switches, and a detection circuit. The first section is configured such that the first and second switches operate in an alternating manner in response to the switching signal. The second section is configured such that the third and fourth switches operate in an alternating manner in response to the switching signal and a second control signal from the detection circuit. The first and second sections are coupled to a node. The detection circuit is coupled to the second section and is configured to measure a voltage at the node between the operation of the third and fourth switches and deactivate the second section when the voltage is above a predetermined threshold.

Figure 1:
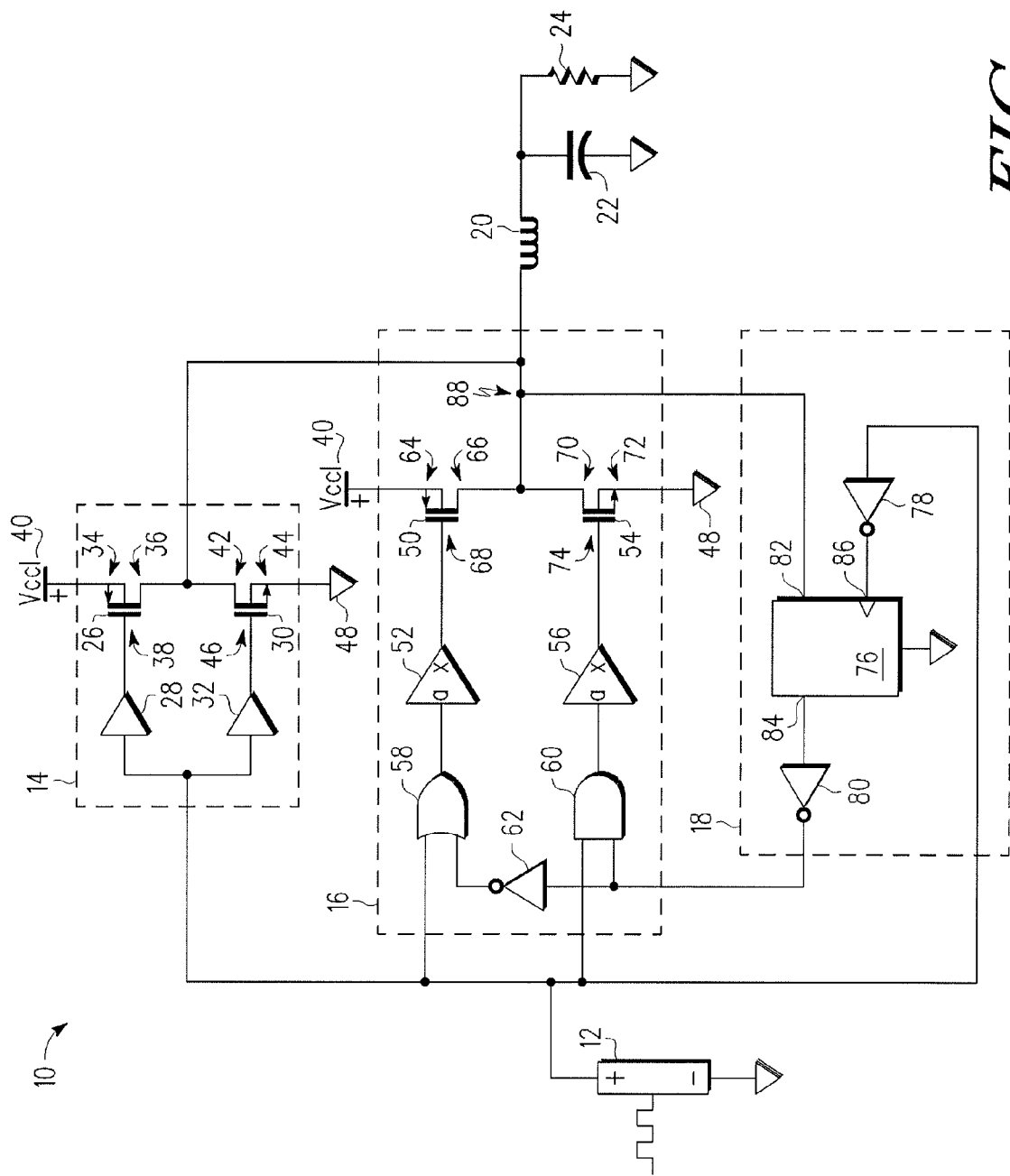
FIG. 1 is a schematic of a power converter according to one embodiment of the present invention.

FIG. 1 schematically illustrates a power converter 10 according to one embodiment of the present invention. The power converter 10 includes a controller 12, a first switching section 14, a second switching section 16, a detection circuit 18, a switching inductor 20, a filter capacitor 22, and a resistive load 24. The controller 12, in one embodiment, is a pulse width modulator that provides a two-state switch drive signal.

The first switching section 14 includes a first switch 26, a first buffer 28, a second switch 30, and a second buffer 32. The first switch 26 includes a high side 34, a low side 36, and gate 38. The high side 34 of the first switch 26 is connected to a voltage source 40, while the low side 36 is connected to the second switch 30. The gate 38 is connected to the first buffer 28.

Likewise, the second switch 30 includes a high side 42, a low side 44, and a gate 46. The high side 42 of the second switch 30 is connected to the low side 36 of the first switch 26. The low side 44 of the second switch 30 is connected to a system ground terminal (or simply "ground") 48. The gate 46 of the second switch 30 is connected to an output of the second buffer 32. In one embodiment, the first and second switches 26 and 30 are semiconductor field effect transistors (FETs), with the first switch 26 being a "p-type" transistor and the second switch 30 being an "n-type" transistor, as are commonly understood in the art. The first and second buffers 28 and 32 are driven in parallel by the output of the controller 12 as shown in FIG. 1. Although not illustrated in detail, the first and second buffers 28 and 32 include circuitry capable of generating a delay between the operation of the first and second switches 26 and 30, as will be described in greater detail below.

Still referring to FIG. 1, the second switching section 16 includes a third switch 50, a third buffer 52, a fourth switch 54, a fourth buffer 56, an OR gate 58, an AND gate 60, and an inverter 62. The third of switch 50 includes a high side 64, a low side 66, and a gate 68. The high side 64 is connected to the voltage source 40. The low side 66 of the third switch 50 is connected to the fourth switch 54. The gate 68 is connected to an output of the third buffer 52. The fourth switch 54 includes a high side 70, a low side 72, and a gate 74. The high side 70 of the fourth switch 54 is connected to the low side 66 of the third switch. The low side 72 of the fourth switch is connected to the ground terminal 48. The gate 74 is connected to an output of the fourth buffer 56.

The third and fourth switches 50 and 54, in one embodiment, are semiconductor FETs, similar to the first and second switches 26 and 30. However, as indicated in FIG. 1, the third and fourth switches 50 and 54 may be considerably larger (e.g., cover a greater area on the substrate or have lower "on-resistance") than the first and second switches 26 and 30. In one embodiment, the third and fourth switches 50 and 54 are approximately 9 times larger than the first and second switches 26 and 30. It should be understood that the arrangement of switches shown in FIG. 1 and described above is merely intended as an example of numerous possible arrangements of switches, as other embodiments may utilize different numbers of switches for each of the switching sections, as well as different sizes of FETs.

Inputs of the third and fourth buffers 52 and 56 are connected to outputs of the OR gate 58 and the AND gate 60, respectively. Similar to the first and second buffers 28 and 32, the third and fourth buffers 52 and 56 are capable of generating a delay between the operation of the third and fourth switch is 50 and 54, as described below. A first input of the OR gate 58 is connected to the output of the controller 12, and a second input of the OR gate 58 is connected to the detection circuit 18 through inverter 62. First and second inputs of the AND gate 60 are connected to the output of the controller 12 and the detection circuit 18, respectively.

The detection circuit 18 includes a data flip-flop 76 and inverters 78 and 80. As is commonly understood, the flip-flop 76 includes a D input 82, Q output 84, and a clock input 86. The D output 82 of the flip-flop 76 is connected to the second inputs of the OR gate 58 and the AND gate 60 through inverter 62. The clock input 86 is connected to the output of the controller 12 through inverter 78. As commonly understood, the flip-flop 76 is a digital logic circuit that outputs the state of the D input 82 when receiving a "rising edge" of a clock signal (i.e., after being inverted by inverter 78) through the clock input 86. It should be understood that the OR gate 58, the AND gate 60, and inverter 62 within the second switching section 16 may be understood to form part of the detection circuit 18 and operate with the detection circuit 18 to activate and deactivate the second switching section 16, as described below.

The first switching section 14, the second switching section 16, and the detection circuit 18 are connected to an output (or inductor) node 88 of the converter 10. In particular, the first switching section 14 is connected to the output node 88 which is the connection of the low side 36 of the first switch 26 and the high side 42 of the second switch 30. The second switching section 16 is connected to the output node 88 between the low side 66 of the third switch 50 and the high side 70 of the fourth switch 54. As is commonly understood, the low side 36 of the first switch 26, the high side 42 of the second switch 30, the low side 66 of the third switch 50, and the high side 70 of the fourth switch 54 drive the output node 88 (i.e., are electrically equivalent to the output node 88). Within the detection circuit 18, the D input 82 of the flip-flop 76 is connected to the output node 88 and receives a signal therefrom.

The filter capacitor 22 and the representative resistive load 24 are connected in parallel to the output note 88 through the switching inductor 20. Although shown schematically as a resistor, the resistive load 24 may be an electronic device or circuit that the voltage source 40 is intended to power through the converter 10, as commonly understood. Although not shown, a feedback loop may also be provided to the controller 12 to adjust the duty cycle of the switching signal in response to changes in the input voltage (e.g., the voltage source 40) and/or the voltage provided to the load 24.

During operation, the controller 12 generates a switching signal, such a pulse modulation square wave that cycles between a high state (e.g., 1 or "on") and a low state (e.g., 0 or "off"). The switching signal is provided to the first and second switching sections 14 and 16 and the detection circuit 18.

Within the first switching section 14, due to the delay caused by the first and second buffers 28 and 32 and the opposite conductivity types (i.e., p-type and n-type) of the switches 26 and 30, the first and second switches 26 and 30 are activated in an alternating manner. That is, the first switch 26 is "turned on" and "turned off." Then, after a brief delay, as caused by the buffers 28 and 32, the second switch 30 is turned on and then turned off. After the second switch 30 is turned off, the first switch is turned on again after the delay. The on and off times of the switches 26 and 30 may be, for example, approximately 0.3 microseconds (μs), and the delay between one switch being turned off and the other being turned on may be, for example, approximately 0.03 μs.

When operating at high loads, the second switching section 16 operates in a manner similar to that of the first switching section 14. That is, a delay in the switching signal generated by the third and fourth buffers 52 and 56, when combined with the conductivity types of the third and fourth switches 50 and 54, causes the third and fourth switches 50 and 54 to operate in a similar an alternating manner. Thus, the operation of the third switch 50 may be simultaneous with the operation of the first switch 26, and operation of the fourth switch 54 may be simultaneous with the operation of the second switch 30. In particular, the third switch 50 may be turned on and turned off at substantially the same instances that the first switch 26 is turned on and turned off, and the fourth switch 54 may be turned on and turned off at substantially the same instances the second switch 30 is turned on and turned off.

When the first and third switches 26 and 30 are turned on (and the second and fourth switches 30 and 54 are turned off), current flows simultaneously from the voltage source 40 through the first and third switches 26 and 26, and the switching inductor 20 into the load 24. When the second and fourth switches 30 and 54 are turned on (and the first and third switches 26 and 30 are turned off), current flows simultaneously from the switching inductor 20, and the second and fourth switches 30 and 54, and into the ground terminal 48. In this way, a desired average current is impressed through the switching inductor 20 such that the load 24 is provided with the desired voltage.

Figure 2:
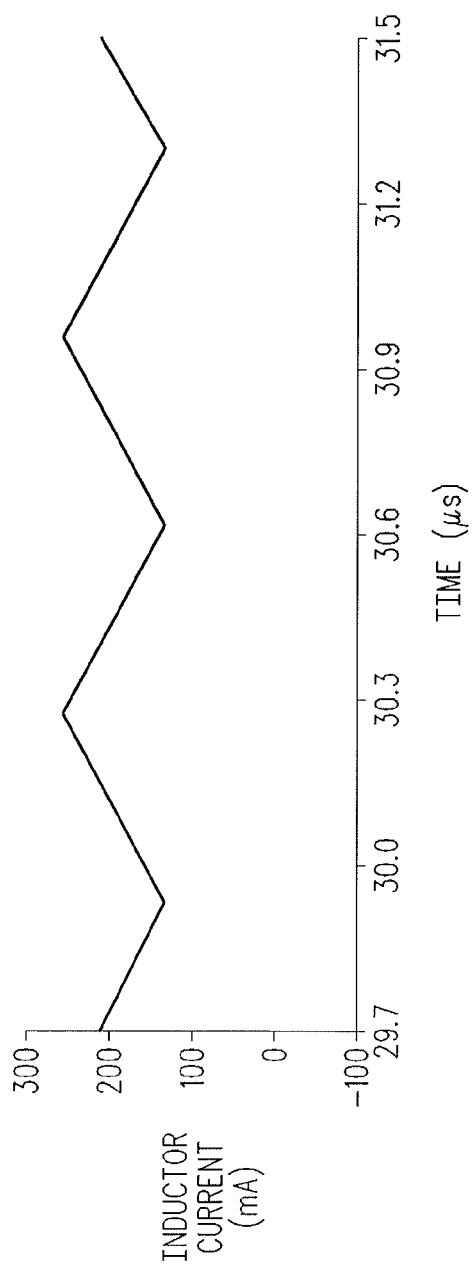
FIG. 2 is a graph of the inductor current of the power converter of FIG. 1 during a period of high load operation.
Figure 3:
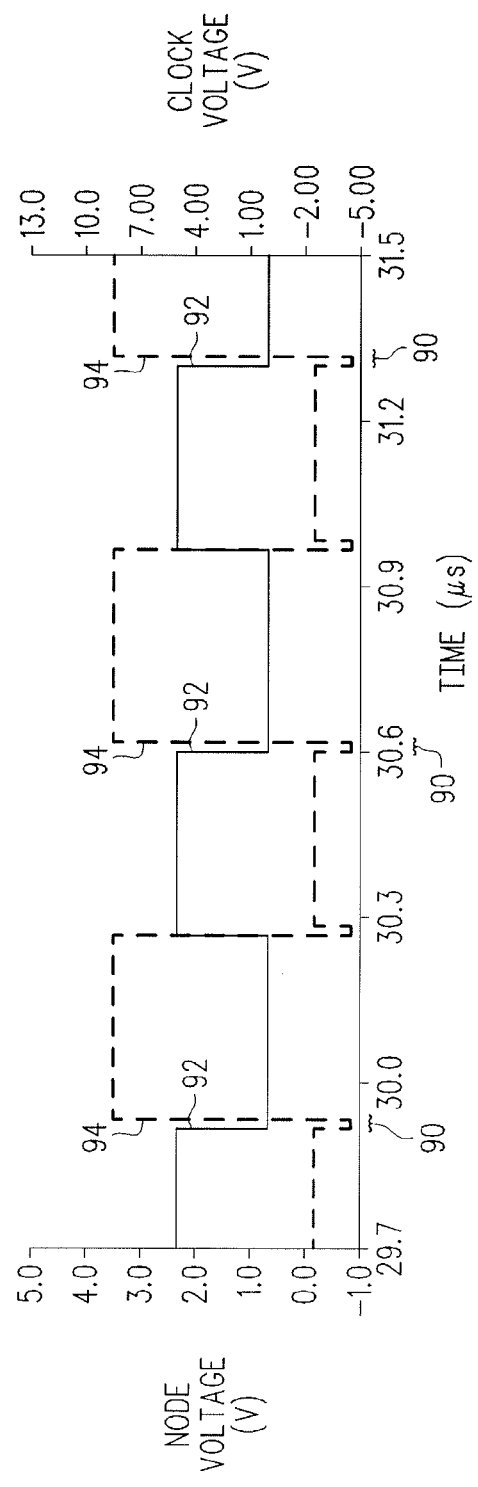
FIG. 3 is a graph of a node voltage and a clock voltage of the power converter of FIG. 1 during the same period of time as FIG. 2.

FIGS. 2 and 3 graphically illustrate the switching inductor current and the voltage at the output node relative to the switching signal (i.e., clock voltage) at a relative high average inductor current (e.g., approximately 180 milliamps (mA)). In the embodiment depicted in FIGS. 1-3, the first and third switches 26 and 50 are turned on during the low state of the switching signal, during which time the node voltage is relative high (or is "up") and the current flowing through the switching inductor towards the load increases (e.g., to approximately 240 mA). During the high state of the switching cycle, the second and fourth switches 30 and 54 are turned on, during which time the node voltage is relatively low (or is "down") and the current flowing through the switching inductor decreases (e.g., to approximately 120 mA). Of particular interest in FIG. 3 are the delays 90 that occur between the ends of the high state of the switching signal (i.e., the "falling edges" 92) and the increase 94 in the node voltage. As will be appreciated by one skilled in the art, this delay can be generated from built-in differences in the internal delays of the various buffers 28, 32, 52 and 56.

FIGS. 4 and 5 graphically illustrate the switching inductor current and the voltage at the output node relative to the switching signal (i.e., clock voltage) at a relative low average inductor current (i.e., approximately 20 mA). When the first and third switches 26 and 50 are turned on during the low state of the switching signal, the node voltage is relative high (or is "up") and the current flowing through the switching inductor towards the load increases (e.g., to approximately 80 mA). When the second and fourth switches 30 and 54 are turned on, the node voltage is relatively low (or is "down") and the current flowing through the switching inductor decreases into a "negative" current (e.g., −40 mA). As will be appreciated by one skilled in the art, the negative inductor current occurs when the average load current is low and the normal decrease in inductor current during the high state of the switching signal causes the direction of current flow to reverse.

Of particular interest in FIG. 5 is that no significant delays occur between the ends of the high state of the switching signal and the increase in the node voltage. As will be appreciated by one skilled in the art, the lack of delays arises from the inductor current "pulling" the output node up immediately after the second and fourth switches are turned off. As such, when the load is sufficiently low, the inductor current becomes negative during the operation of the low switches and the node voltage increases simultaneously with the falling edge of the switching signal.

Referring again to FIG. 1, at each falling edge (i.e., synchronously or in response to each falling edge) of the switching signal, the Q output 84 of the flip-flop 76 takes a value dependent on the node voltage (i.e., measured at node 88) at that time. If the node voltage is not high at the falling edge (i.e., the load current is high), the Q output 84 takes a 0 value, which is inverted into a 1 by inverter 80 and fed into the second switching section 16. The inverted signal is received by the AND gate 60, causing the fourth switch 54 to remain active and responsive to the switching signal. The signal is also received by the OR gate 58, after being inverted again by inverter 62 into a 0, causing the third switch 50 to remain active (i.e., the third switch 50 is turned on by the switching cycle being low).

If the node voltage is up at the falling edge (i.e., the load current is low), the Q output 84 of the flip-flop 76 takes a 1 value, which is inverted into a 0 by inverter 80 and fed into the second switching section 16. The inverted signal is received by the AND gate 60, causing the fourth switch 54 to be deactivated and not responsive to the switching signal. The signal is also received by the OR gate 58, after being inverted again by inverter 62 into a 1, causing the third switch 50 to be deactivated (i.e., a high value input into either of the inputs of the OR gate 58 causes the OR gate 58 to output a high value). Thus, during periods of relatively low loads (e.g., when the inductor current becomes negative at least at the end of a switching cycle), the second switching section 16 is deactivated, while the first switching section 14 continues to receive the switching signal from the controller 12 and operate normally.

One advantage is that when the converter is operating at low loads, because only a small portion of the switches are used, gate drive losses ($Q_G$) are reduced while resistive losses ($I^2R_{ON}$) are only slightly increased. As a result, the total losses may be effectively reduced to improve the performance of the power converter. Another advantage is that the disabling of the second section of switches may be carried out with only a negligible amount of additional circuitry (e.g., the flip-flop). Therefore, any increase in manufacturing cost is minimized. Also, because only simple logic circuits are used, no additional DC current is used in obtaining the functionality described above.

FIG. 6 illustrates a semiconductor package 96 in which the power converter 10 (FIG. 1) may be implemented. The semiconductor package 96 includes a package substrate 98 having a microelectronic die 100 mounted to a top surface thereof and contact formations (e.g., solder balls) 102 attached to a bottom surface thereof. As is commonly understood, the microelectronic die 100 may include the power converter 10, or at least a majority of the components of the power converter 10, formed thereon in the form of an integrated circuit. The die 100 may include a substrate, such as a semiconductor substrate made primarily of silicon (Si), germanium (Ge), gallium arsenide (GaAs), or a combination thereof. The die 100 may be singulated from a semiconductor wafer with a diameter of, for example, approximately 150, 200, or 300 millimeters (mm). The integrated circuit may be formed using complimentary metal-oxide-semiconductor (CMOS) processing steps, or other suitable semiconductor processes, as the substrate defines a circuit plane where etching, deposition, or other techniques are used to form the integrated circuit in one or more layers.

FIG. 7 illustrates a circuit board 104 with a semiconductor package 96, similar to that shown in FIG. 6, attached thereto via the contact formations 102. However, in the embodiment shown in FIG. 7, a portion of the power converter 10 (FIG. 1) is implemented within a second semiconductor package 106 attached to the circuit board 104 and electrically connected to the semiconductor package 96 through conductive traces 108 formed on the circuit board 104. In particular, the third and fourth switches 50 and 54 may be implemented on a second die (or semiconductor substrate) 110 within the second semiconductor package 106. The larger switches are contained within a discrete component separate from the remainder of the power converter 10 (FIG. 1), including the first and second switches 26 and 30 formed on the die 100 of semiconductor package 96.

A power converter is provided. The power converter includes a controller configured to generate a switching signal. A first section is coupled to the controller and has first and second switches. The first section is configured such that the first and second switches operate in an alternating manner in response to the switching signal. A second section is coupled to the controller and has third and fourth switches. The second section is configured such that the third and fourth switches operate in an alternating manner in response to the switching signal. The first and second sections are coupled to a node. A detection circuit is coupled to the second section. The detection circuit is configured to measure a voltage at the node between the operation of the third and fourth switches and deactivate the second section when the voltage is above a predetermined threshold.

Each of the switches may have a low side and a high side, and the low side of the third switch may be electrically connected to the high side of the fourth switch. The node may be connected between the low side of the third switch and the high side of the fourth switch.

The power converter may also include an inductor coupled to the first and second sections. The operation of the first, second, third, and fourth switches may cause current to flow through the inductor. The controller and the first section may be configured such that the operation of the first and second switches continues after the deactivation of the second section. The high sides of the first and third switches may be connected to a voltage source, and the low sides of the second and fourth switches may be connected to a ground.

The operation of the third and fourth switches may include repeatedly turning on and turning off the third and fourth switches. The second section may be configured such that there is a delay between turning off the fourth switch and turning on the third switch, and the measuring of the output voltage may occur during the delay.

The detection circuit may be coupled to the controller and measure the output voltage in response to the switching signal. The detection circuit may include a flip-flop configured to output a signal representative of the voltage synchronously with an edge of the switching signal. The first and second switches may be formed on a first semiconductor substrate, and the third and fourth switches may be formed on a second semiconductor substrate.

A power converter is provided. The power converter includes a controller configured to generate a switching signal. A first section is coupled to the controller and has first and second switches. The first section is configured such that the first and second switches operate in an alternating manner in response to the switching signal. A second section is coupled to the controller and has third and fourth switches. The second section is configured such that the third and fourth switches operate in an alternating manner in response to the switching signal. The first and second sections are coupled to a node. An inductor is coupled the first and second sections. The operation of the first, second, third, and fourth switches causes current to flow through the inductor. A detection circuit is coupled to the second section. The detection circuit is configured to measure a voltage at the node synchronously with an edge of the switching signal, deactivate the second section when the measured voltage is above a predetermined threshold, and reactivate the second section when the measured voltage is below the predetermined threshold.

The operation of the third and fourth switches may include repeatedly turning on and turning off the third and fourth switches. The second section may be configured such that there is a delay between turning off the fourth switch and turning on the third switch, and the measuring of the voltage may occur during the delay. The controller and the first section may be configured such that the operation of the first and second switches continues after the deactivation of the second section.

A method for converting electric power is provided. First and second switches coupled to an inductor are alternatingly operated. Third and fourth switches coupled to the inductor are alternatingly operated. The operation of the first, second, third, and fourth switches causes current to flow through the inductor. The current flowing through the inductor between the operation of the third and fourth switches is measured. The operating of the third and fourth switches is ceased if the measured current is below a predetermined current threshold.

The method may also include continuing the operating of the first and second switches if the measured current is below the predetermined current threshold. Each of the switches may have a low side and a high side, and the low side of the third switch may be electrically connected to the high side of the fourth switch.

The measuring of the current flowing through the inductor may include measuring a voltage at a node electrically connected to the low side of the third switch and the high side of the fourth switch. A measured voltage greater than a predetermined voltage threshold may be indicative of the current flowing through the inductor being below the predetermined current threshold.

The low side of the first switch may be electrically connected to the high side of the second switch. The node may be electrically connected to the low side of the first switch and the high side of the second switch. The high sides of the first and third switches may be electrically connected to a voltage source, and the low sides of the second and fourth switches may be electrically grounded.

The method may also include generating a switching signal and providing the switching signal to the first, second, third, and fourth switches to cause the operation of the first, second, third, and fourth switches. The measuring of the voltage and the ceasing of the operation of the third and fourth switches may be performed with a flip-flop electrically connected to the node and in response to the switching signal.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A power converter comprising:
   a controller configured to generate a switching signal;
   a first section coupled to the controller and having first and second switches, the first section being configured such that the first and second switches operate in an alternating manner in response to the switching signal;
   a second section coupled to the controller and having third and fourth switches, the second section being configured such that the third and fourth switches operate in an alternating manner in response to the switching signal, wherein the first and second sections are coupled to a node; and
   a detection circuit coupled to the second section, the detection circuit being configured to measure a voltage at the node between the operation of the third and fourth switches and deactivate the second section when the voltage is above a predetermined threshold.

2. The power converter of claim 1, wherein each of the switches has a low side and a high side and the low side of the third switch is electrically connected to the high side of the fourth switch.

3. The power converter of claim 2, wherein the voltage is measured at a node between the low side of the third switch and the high side of the fourth switch.

4. The power converter of claim 1, further comprising an inductor coupled to the first and second sections, the operation of the first, second, third, and fourth switches causing current to flow through the inductor.

5. The power converter of claim 1, wherein the controller and the first section are configured such that the operation of the first and second switches continues after the deactivation of the second section.

6. The power converter of claim 1, wherein the high sides of the first and third switches are connected to a voltage source and the low sides of the second and fourth switches are connected to a ground.

7. The power converter of claim 1, wherein the operation of the third and fourth switches comprises repeatedly turning on and turning off the third and fourth switches and the second section is configured such that there is a delay between turning off the fourth switch and turning on the third switch and the measuring of the voltage occurs during the delay.

8. The power converter of claim 1, wherein the detection circuit is coupled to the controller and measures the voltage in response to the switching signal.

9. The power converter of claim 8, wherein the detection circuit comprises a flip-flop configured to output a signal representative of the voltage synchronously with an edge of the switching signal.

10. The power converter of claim 1, wherein the first and second switches are formed on a first semiconductor substrate and the third and fourth switches are formed on a second semiconductor substrate.

11. A power converter comprising:
a controller configured to generate a switching signal;
a first section coupled to the controller and having first and second switches, the first section being configured such that the first and second switches operate in an alternating manner in response to the switching signal;
a second section coupled to the controller and having third and fourth switches, the second section being configured such that the third and fourth switches operate in an alternating manner in response to the switching signal, wherein the first and second sections are coupled to a node;
an inductor coupled the first and second sections, the operation of the first, second, third, and fourth switches causing current to flow through the inductor; and
a detection circuit coupled to the node and the second section, the detection circuit being configured to:
measure a voltage at the node synchronously with an edge of the switching signal;
deactivate the second section when the measured voltage is above a predetermined threshold; and
reactivate the second section when the measured voltage is below the predetermined threshold.

12. The power converter of claim 11, wherein the operation of the third and fourth switches comprises repeatedly turning on and turning off the third and fourth switches.

13. The power converter of claim 12, wherein the second section is configured such that there is a delay between turning off the fourth switch and turning on the third switch and the measuring of the voltage occurs during the delay, and the controller and the first section are configured such that the operation of the first and second switches continues after the deactivation of the second section.

14. A method for converting electric power comprising:
alternatingly operating first and second switches coupled to an inductor;
alternatingly operating third and fourth switches coupled to the inductor, the operation of the first, second, third, and fourth switches causing current to flow through the inductor;
measuring the current flowing through the inductor between the operation of the third and fourth switches; and
ceasing the operating of the third and fourth switches if the measured current is below a predetermined current threshold.

15. The method of claim 14, further comprising continuing the operating of the first and second switches if the measured current is below the predetermined current threshold.

16. The method of claim 15, wherein each of the switches has a low side and a high side, and the low side of the third switch is electrically connected to the high side of the fourth switch.

17. The method of claim 16, wherein the measuring of the current flowing through the inductor comprises measuring a voltage at a node electrically connected to the low side of the third switch and the high side of the fourth switch.

18. The method of claim 17, wherein a measured voltage greater than a predetermined voltage threshold is indicative of the current flowing through the inductor being below the predetermined current threshold.

19. The method of claim 18, wherein the low side of the first switch is electrically connected to the high side of the second switch, the node is electrically connected to the low side of the first switch and the high side of the second switch, and the high sides of the first and third switches are electrically connected to a voltage source and the low sides of the second and fourth switches are electrically grounded.

20. The method of claim 19, further comprising generating a switching signal and providing the switching signal to the first, second, third, and fourth switches to cause the operation of the first, second, third, and fourth switches, and wherein the measuring of the voltage and the ceasing of the operation of the third and fourth switches is performed with a flip-flop electrically connected to the node and in response to the switching signal.

* * * * *